J. H. HANLON.
DRIFTING VALVE FOR LOCOMOTIVES.
APPLICATION FILED NOV. 16, 1916.
1,312,906.
Patented Aug. 12, 1919.
2 SHEETS—SHEET 1.
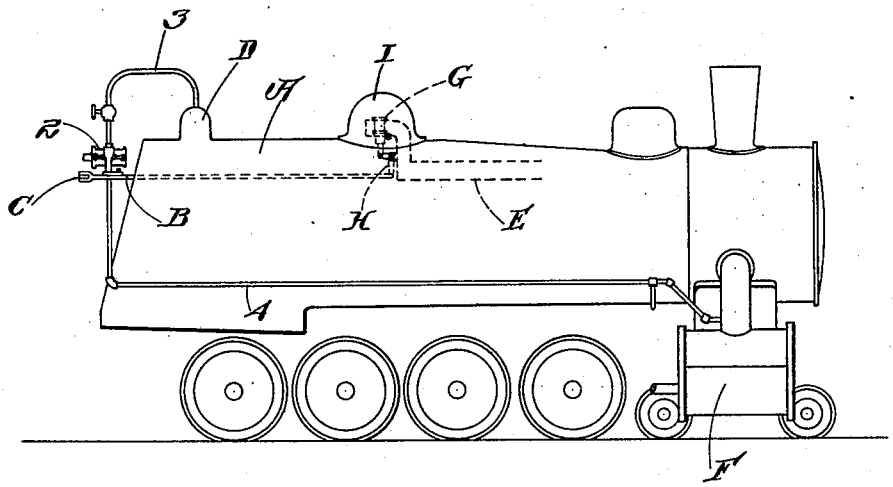
Fig. 1.
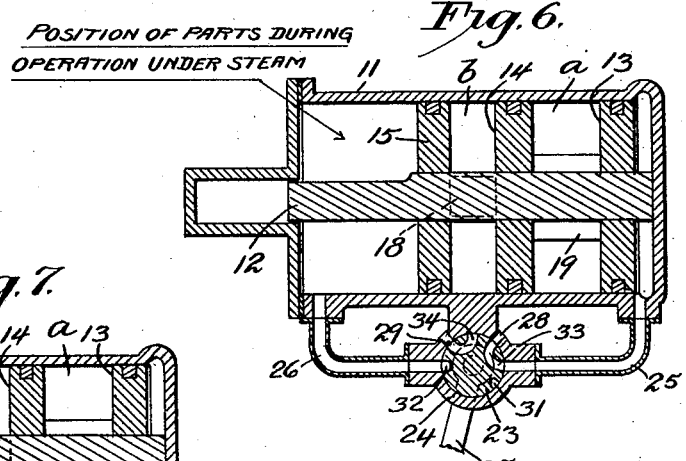
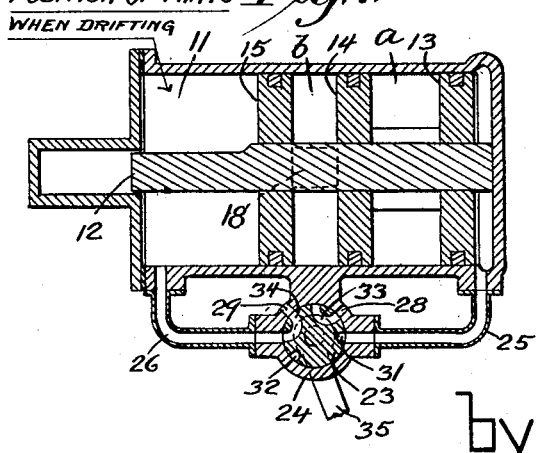
INVENTOR:
John H. Hanlon
by Macleod, Calver, Copeland & Dike
Attys.

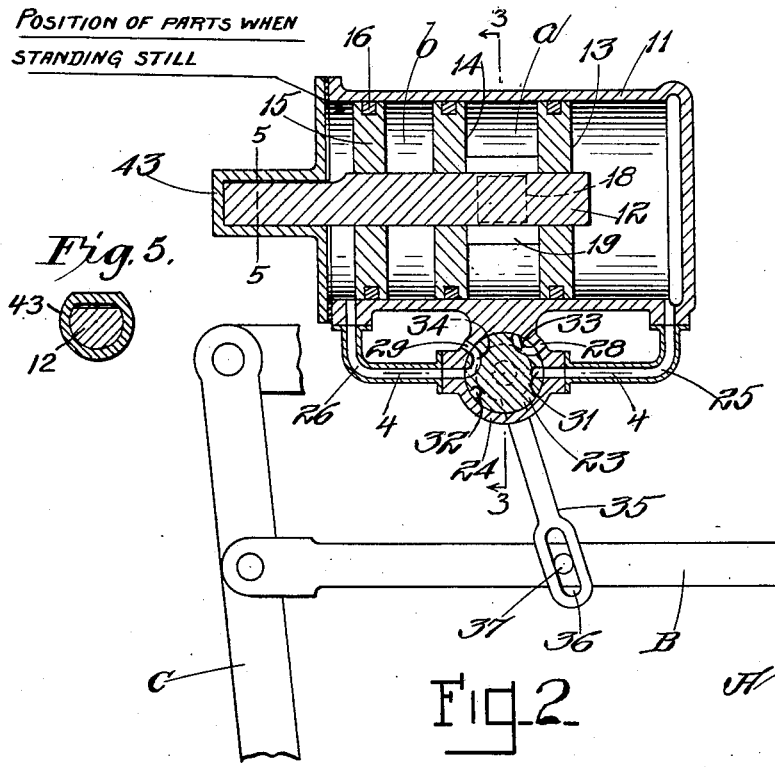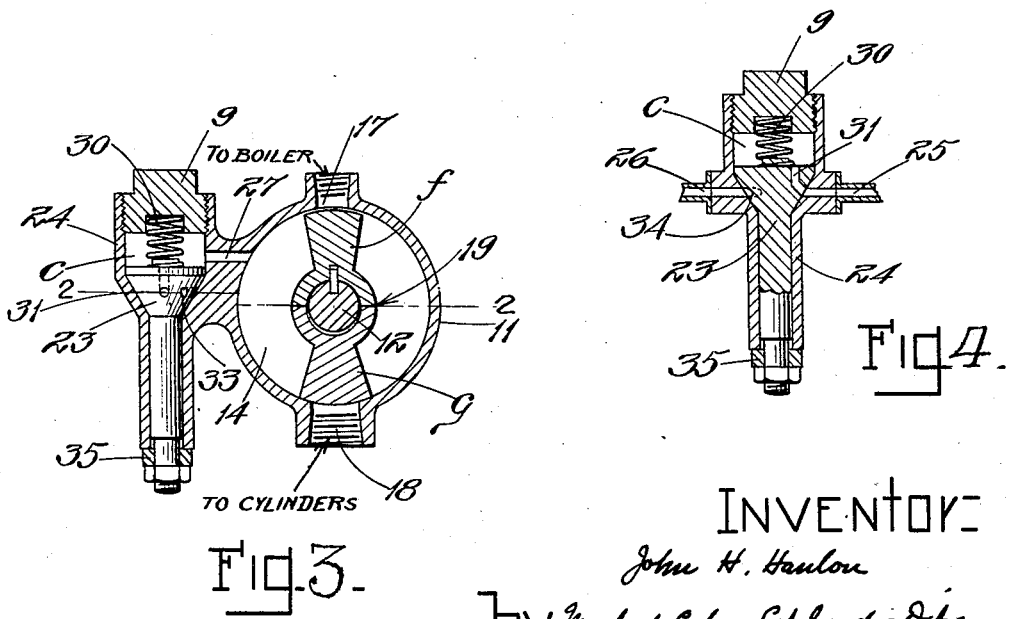

UNITED STATES PATENT OFFICE.

JOHN H. HANLON, OF SOMERVILLE, MASSACHUSETTS.

DRIFTING-VALVE FOR LOCOMOTIVES.

1,312,906.   Specification of Letters Patent.   Patented Aug. 12, 1919.

Application filed November 16, 1916. Serial No. 131,784.

*To all whom it may concern:*

Be it known that I, JOHN H. HANLON, a citizen of the United States, residing at Somerville, county of Middlesex, State of Massachusetts, have invented a certain new and useful Improvement in Drifting-Valves for Locomotives, of which the following is a specification, reference being had therein to the accompanying drawings.

In locomotives employing superheated steam, it is found that the difficulties of cylinder lubrication are much increased owing to the high temperature in the cylinder walls and to the fact that superheated steam does not have the lubricating qualities of saturated steam. These difficulties arise particularly when the locomotive is running on a down grade with the throttle shut off. Under these conditions, the high temperature of the cylinder walls resulting from the previous use of superheated steam causes them to dry almost instantly and bakes or carbonizes the lubricating oil destroying its lubricating qualities so that the wear is excessive and injury is done to the pistons and cylinders. The carbonization of the lubricating oil produces a deposit on the cylinder head and piston head which is objectionable for various reasons. By the use of a suitable drifting valve, it is possible to do away with by-pass valves and also to eliminate the use of relief valves and thereby prevent the cylinders from being filled with air, cinders, and dust, as is the case when relief valves are used.

As heretofore constructed, pressure has sometimes built up in the locomotive cylinders when the engine has been standing thus causing the engine to start if the brakes are released or causing the reverse lever to kick when it is unlatched. Frequently steam is not admitted to the cylinders soon enough after the throttle is closed, this being the time when the cylinders are hottest and injury is most likely to occur.

My invention has for its object a drifting valve which is entirely automatic in its action and which is adapted to supply to the cylinders of the locomotive saturated steam in sufficient quantities whenever the throttle is closed. When the locomotive comes to a standstill, the supply of wet steam to the cylinders is automatically cut off completely and the pressure cannot build up in the cylinders and start the locomotive or cause the reverse lever to kick. The valve embodying my invention is wholly automatic in its operation and requires no attention whatever on the part of the engineer.

The invention will be fully understood from the following description taken in connection with the accompanying drawings and the novel features thereof are pointed out and clearly defined in the claims at the close of this specification.

In the drawings, Figure 1 is a side elevation of a locomotive to which the device embodying my invention is applied, a few of the parts only being shown for the sake of clearness.

Fig. 2 is a horizontal section of my improved drifting valve taken on line 2—2 of Fig. 3 showing the connection on the throttle lever of the locomotive.

Fig. 3 is a section on line 3—3 of Fig. 2.

Fig. 4 is a section of the control valve on line 4—4 of Fig. 2.

Fig. 5 is a section on line 5—5 of Fig. 2.

Fig. 6 is a view similar to Fig. 2 showing the position of the parts during operation under steam.

Fig. 7 is a view similar to Fig. 2 showing the position of the parts when drifting.

Referring to the drawings, at A is shown the boiler of a locomotive, at B the main throttle stem, and at C the throttle lever, these parts being of ordinary construction. The boiler A is provided with a steam dome I and a main steam pipe E by which steam is furnished to the cylinders F, a portion only of which pipe is shown. The passage of steam through the main steam pipe E is governed by the usual throttle valve G operatively connected with the throttle stem B by a suitable bell crank H. At the rear end of the boiler A adjacent the throttle lever C is a drifting valve 2 which is connected with a steam dome D by means of a pipe 3 and with the cylinders F by means of a pipe 4 so that saturated steam is permitted to pass from the boiler to the engine cylinders when the drifting valve is open. It will be understood that the throttle (not shown) will be closed when the lever C is moved forward, that is to the right as shown in Fig. 2, and will be open when moved backward. At 11 is shown the body or cylinder of the drifting valve, this being secured in any convenient position relative to the throttle lever C. Within the drifting valve cylinder 11, is a valve stem 12 on which are secured three pistons 13, 14 and 15 provided with suitable piston rings 16 to prevent leakage. Between the pistons 13 and 14 is a space $a$ which for convenience may be referred to as the standing port; between the pistons 14 and 15 is a space $b$ which I call the running port. The drifting valve cylinder 11 is supplied with saturated steam from the steam dome of the boiler through a supply port 17 (see Fig. 3) and the steam passes to the cylinders through a delivery port 18 by the pipes 3 and 4 referred to above. The supply and delivery ports are located about midway of the length of the cylinder 11. The supply port 17 is smaller than the delivery port 18.

At 19 is shown a valve located in the standing port $a$ and mounted on the valve rod 12. The valve 19 is made in two halves $f$ and $g$, the upper of which is pinned loosely to the valve rod 12. There is a slight clearance around the valve rod to allow the two halves to move slightly relatively to the rod 12, so that the lower half $g$ can seat firmly over the delivery port 18 and close it. As will be seen from the drawings there is a small clearance between the upper end of the valve member 19 and the interior of the drifting valve cylinder so that steam from the supply port 17 will enter the standing port $a$ and will hold the lower half of the valve member firmly against the cylinder walls, closing the delivery port 18 against all possibility of leakage. The difference in pressure between the standing port $a$ and the delivery port is practically boiler pressure and therefore the valve member is held firmly against its seat. It will therefore be seen that when the drifting valve is in the position shown in Fig. 2 the delivery port 18 will be closed by the valve member 19. It will also be seen that when the drifting valve is at the extreme right hand or forward position the running port $b$ will be opposite both the supply port 17 and delivery port 18 and allow a free flow of saturated steam from the boiler to the cylinders of the locomotive, the amount of steam being dependent upon the size of the supply port 17.

The movement of the drifting valve is controlled by a pilot valve which comprises a pilot valve member 23 carried in a pilot valve casing 24 located at the side of the drifting valve. Two ports 25 and 26 connect the pilot valve with the opposite ends of the drifting valve cylinder. A port 27 leads from the center of the drifting valve cylinder into the top of the space $c$ above the pilot valve 23. Two ports 28 and 29 lead to the atmosphere. The pilot valve is preferably of conical form and is held on its seat by a cap 9 and spring 30. It is provided with two ports 31 and 32 adapted to connect the ports 25 and 26 leading to the ends of the drifting valve cylinder with the space above the pilot valve. Two other ports 33 and 34 connect the ports 25 and 26 with the ports 28 and 29 respectively, to exhaust the ends of the drifting valve cylinder to the atmosphere at certain times. The pilot valve is moved by a pilot valve lever 35 slotted as shown at 36 and connected with the throttle stem B by a pin 37.

On one end of the cylinder is a boss 43 to receive the extended end of the valve rod 12, which is slabbed off on the end. The interior of the boss is of D-shape in cross-section to receive the slabbed off end of the valve rod and keep the drifting valve from turning on its longitudinal axis.

The operation of the hereindescribed drifting valve is as follows:

When the locomotive is standing still the parts are in the position shown, the throttle lever C being to the right as shown in Fig. 2 and the drifting valve being to the left. At this time the standing port $a$ is filled with steam at boiler pressure and the lower half of the valve 19 is seated over the delivery port 18 shutting off the supply of saturated steam to the locomotive cylinders. The steam also flows through port 27 and fills the space above the pilot valve 23. When the throttle lever is pulled out to open the throttle, the pilot valve 23 is rotated connecting port 32 with port 26 and port 33 with ports 25 and 28. When the ports are in this position, steam flows from the space $c$ above the pilot valve into port 32 and port 26 and thence into the left hand end of the drifting valve cylinder, the right hand end of the drifting valve cylinder being at this time vented to the atmosphere through the port 25 and ports 33 and 28. The drifting valve will move to the right causing the running port $b$ to connect the supply port 17 with the delivery port 18. Steam may then flow from the steam dome to the cylinders of the locomotive but this flow will not be of any consequence because the cylinders will be fully supplied with steam through the "dry pipes" in the ordinary manner.

When the locomotive engineer shuts his throttle on reaching the top of a grade or on approaching a station, the pilot valve 23 is thereby returned to the position shown in Fig. 2 but the drifting valve does not resume the position shown in Fig. 2 until the locomotive comes to a standstill. The reason for this action will be apparent from the following explanation. When the pilot valve is changed to the position shown in Fig. 2, the left hand end of the drifting valve cylinder is vented to the atmosphere through port 26, port 34 and port 29 and at the same time the right hand end of the drifting valve cylinder is connected with the running port $b$ through ports 27, 31 and 25. However, no steam pressure will build up in the right hand end of the drifting valve cylinder because of the great suction produced by the cylinders of the locomotive on the running port *b*, the supply of steam through the supply port 17 being wholly insufficient to overcome the suction. As at this time, the left hand end of the drifting valve cylinder is vented to the atmosphere and as there is no pressure but on the contrary a partial vacuum in the right hand end, the drifting valve will retain its position toward the extreme right. During this time steam will flow freely from the steam dome to the cylinders of the locomotive and in sufficient quantity to prevent the carbonization of lubricating oil and to assist materially in the lubrication of the cylinder walls. Just as soon as the locomotive slows down sufficiently the suction is reduced and the pressure produced by the steam in the running port *b*, builds up in the right hand end of the drifting valve cylinder and the drifting valve will move over to the left until the standing port *a* is opposite the supply and delivery ports. At this time the delivery port will be closed by the valve member 19 which will be firmly seated owing to the difference in pressure between the two sides of the valve member 19. This will prevent any pressure building up in the locomotive cylinders which would tend to start the locomotive if the pressure should become sufficient.

It will be seen from the foregoing description that the operation of the drifting valve is wholly automatic, requiring no attention whatever on the part of the engineer. The supply of saturated steam to the cylinders begins the instant the throttle is shut off since the connection is wide open while the locomotive is taking steam through the throttle valve. There is no opportunity for leakage about the locomotive cylinders in such a manner as to obscure the vision of the engineer.

It is practically impossible for the drifting valve to stick in either position because it is subjected to full boiler pressure; furthermore if the packings on the piston of the drifting valve leak, this will be immediately apparent from steam blowing through one of the exhaust ports 28 and 29 into the cab. No superheated steam will enter the drifting valve and destroy the lubrication in it because the pressure throughout the system is practically equalized when the locomotive is running.

The particular construction of the drifting valve shown in the drawings in which the valve controlling the delivery port 18 is located intermediate the parts of a double piston is a satisfactory one for various reasons particularly because it is compact but I do not limit myself to this construction as it is not essential to my invention in its broader aspect.

What I claim is:

1. In a device of the character described, a drifting valve cylinder, a conduit leading from the boiler through the said cylinder to the cylinders of the locomotive, a valve controlling the passage of steam through said drifting valve cylinder, a piston in said cylinder connected to said valve and actuating it, a throttle actuated pilot valve, and a casing therefor having ports entering the drifting valve cylinder on opposing faces of the piston and ports leading to the atmosphere and to a portion of the said steam conduit which leads from the boiler to the cylinders of the locomotive, all of said ports being controlled by said pilot valve.

2. In a device of the character described, a drifting valve cylinder, a conduit leading from the boiler through the said cylinder and entering and leaving the cylinder through ports in the walls thereof, a piston having a space therein by which said ports may be connected, a valve to close one of said ports and connected to said valve and actuated by it, a throttle actuated pilot valve and a casing therefor having ports entering the drifting valve cylinder on opposing faces of the piston, ports leading to the atmosphere and a port leading to a portion of the steam conduit which leads from the boiler to the cylinders of the locomotive, all of said ports being controlled by said pilot valve.

3. In a device of the character described, a drifting valve cylinder, a piston therein having three piston members, a valve member between two of said piston members, a conduit leading from the boiler through said cylinder to the cylinders of the locomotive, the port by which the conduit communicates with the drifting valve cylinder being controlled by the said valve, a throttle actuated pilot valve, and a casing therefor having ports leading to the ends of the drifting valve cylinder, a port leading to the atmosphere and a port leading to a portion of the said steam conduit, all of said ports being controlled by said pilot valve.

In testimony whereof I affix my signature.

JOHN H. HANLON.

Copies of this patent may be obtained for five cents each, by addressing the "Commissioner of Patents, Washington, D. C."